(12) United States Patent
Tian

(10) Patent No.: US 11,826,662 B2
(45) Date of Patent: Nov. 28, 2023

(54) BALLISTIC TRAJECTORY DISPLAY IN A VIRTUAL ENVIRONMENT

(71) Applicant: Tencent Technology (Shenzhen) Company Limited, Guangdong (CN)

(72) Inventor: Yatao Tian, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 508 days.

(21) Appl. No.: 16/898,179

(22) Filed: Jun. 10, 2020

(65) Prior Publication Data

US 2021/0052987 A1    Feb. 25, 2021

Related U.S. Application Data

(63) Continuation of application No. PCT/CN2019/078226, filed on Mar. 15, 2019.

(30) Foreign Application Priority Data

Mar. 22, 2018    (CN) .......................... 201810241909.4

(51) Int. Cl.
*A63F 13/837*    (2014.01)
*A63F 13/358*    (2014.01)
(Continued)

(52) U.S. Cl.
CPC .......... *A63F 13/837* (2014.09); *A63F 13/358* (2014.09); *A63F 13/573* (2014.09);
(Continued)

(58) Field of Classification Search
CPC .... A63F 13/837; A63F 13/358; A63F 13/573; A63F 13/58; A63F 2300/8076; A63F 2300/8082
See application file for complete search history.

(56) References Cited

U.S. PATENT DOCUMENTS 6,582,299 B1 *  6/2003  Matsuyama ............ A63F 13/53
                                                      463/2
2008/0039125 A1    2/2008  Fan et al.
(Continued)

FOREIGN PATENT DOCUMENTS

| CN | 104613816 A | 5/2015 |
| CN | 106730836 A | 5/2017 |
| CN | 108404406 A | 8/2018 |

OTHER PUBLICATIONS

English Translation of International Search Report for corresponding International Application No. PCT/CN2019/078226, dated Jun. 12, 2019.
(Continued)

*Primary Examiner* — Thomas H Henry

(74) *Attorney, Agent, or Firm* — Crowell & Moring LLP

(57) ABSTRACT

Embodiments of this application relate to the computer field, and disclose a ballistic trajectory display method, apparatus, and device in a virtual environment, and a readable medium. The method includes receiving a first shooting signal of a first type of ammunition transmitted by a first terminal The method may further include transmitting an ammunition creating instruction to the first terminal and a second terminal simultaneously according to the first shooting signal. The method may further include transmitting a first display instruction to the first terminal and the second terminal simultaneously in a case of determining that the first type of ammunition hits a target.

20 Claims, 9 Drawing Sheets

(51) Int. Cl.
*A63F 13/573* (2014.01)
*A63F 13/58* (2014.01)

(52) U.S. Cl.
CPC ...... *A63F 13/58* (2014.09); *A63F 2300/8076* (2013.01); *A63F 2300/8082* (2013.01)

(56) References Cited

U.S. PATENT DOCUMENTS

| | | | | |
|---|---|---|---|---|
| 2011/0244957 | A1* | 10/2011 | Nishimura | A63F 13/837 |
| | | | | 463/31 |
| 2013/0005417 | A1* | 1/2013 | Schmidt | A63F 13/655 |
| | | | | 463/8 |
| 2018/0272236 | A1* | 9/2018 | Mulcahy | A63F 13/537 |

OTHER PUBLICATIONS

Written Opinion for corresponding International Application No. PCT/CN2019/078226, dated Jun. 12, 2019 with English Translation.

* cited by examiner

BALLISTIC TRAJECTORY DISPLAY IN A VIRTUAL ENVIRONMENT

PRIORITY

This application is a continuation of and claims priority to PCT/CN2019/078226 filed Mar. 15, 2019, and entitled METHOD AND APPARATUS FOR DISPLAYING BALLISTIC TRAJECTORY IN VIRTUAL ENVIRONMENT, DEVICE, AND READABLE MEDIUM, which is incorporated herein by reference in its entirety. PCT/CN2019/078226 claims priority to Chinese Patent Application No. 21810241909.4, filed with the National Intellectual Property Administration, China on Mar. 22, 2018 and entitled "BALLISTIC TRAJECTORY DISPLAY METHOD, APPARATUS, AND DEVICE IN VIRTUAL ENVIRONMENT, AND READABLE MEDIUM", which is incorporated herein by reference in its entirety.

FIELD OF THE TECHNOLOGY

This disclosure relates to the computer field, and in particular, to a display of ballistic trajectories.

BACKGROUND OF THE DISCLOSURE

A third-person shooting (TPS) game is a game in which a user operates a virtual object from a third-person viewing angle to shoot enemies by using a ranged weapon in a virtual environment. A multiplayer online TPS game is a game in which at least two users operate, by using terminals, respective corresponding virtual objects from a third-person viewing angle to shoot in the same virtual environment.

SUMMARY

An embodiment of this application provides a ballistic trajectory display method in a virtual environment. The method may include receiving a first shooting signal of a first type of ammunition transmitted by a first terminal. The method may further include transmitting an ammunition creating instruction to the first terminal and a second terminal simultaneously according to the first shooting signal, the ammunition creating instruction being used for instructing the first terminal and the second terminal to create the first type of ammunition and display a ballistic trajectory corresponding to the first type of ammunition in the virtual environment. The method may further include determining, according to the first shooting signal, whether the first type of ammunition hits a target. The method may further include transmitting, in a case of determining that the first type of ammunition hits the target, a first display instruction to the first terminal and the second terminal simultaneously, the first display instruction being used for instructing the first terminal and the second terminal to display a hit result of the first type of ammunition to the target in the virtual environment.

An embodiment of this application provides a ballistic trajectory display method in a virtual environment. The method may include receiving an ammunition creating instruction transmitted by a server, the ammunition creating instruction being transmitted to at least two terminals simultaneously by the server after receiving a first shooting signal of a first type of ammunition. The method may further include creating the first type of ammunition according to the ammunition creating instruction, and displaying a ballistic trajectory of the first type of ammunition. The method may further include receiving a first display instruction transmitted by the server, the first display instruction being transmitted to the at least two terminals simultaneously by the server after determining that the first type of ammunition hits a target. The method may further include displaying a hit result of the first type of ammunition to the target according to the first display instruction in the virtual environment. The at least two terminals may include a first terminal transmitting the first shooting signal and a second terminal displaying the same virtual environment and corresponding to the first terminal.

An embodiment of this application provides a ballistic trajectory display method in a virtual environment, applied to a second terminal. The method may include receiving a second shooting signal of a second type of ammunition transmitted by a server. The method may further include creating the second type of ammunition according to the second shooting signal. The method may further include determining an acceleration of the second type of ammunition, and displaying a ballistic trajectory of the second type of accelerated ammunition according to the acceleration in the virtual environment. The method may further include receiving a second display instruction transmitted by the server. The method may further include displaying a hit result of the second type of ammunition to a target according to the second display instruction in the virtual environment.

An embodiment of this application provides a ballistic trajectory display apparatus in a virtual environment. The apparatus may include a receiving module, configured to receive a first shooting signal of a first type of ammunition transmitted by a first terminal. The apparatus may further include a transmission module, configured to transmit an ammunition creating instruction to the first terminal and a second terminal simultaneously according to the first shooting signal, the ammunition creating instruction being used for instructing the first terminal and the second terminal to create the first type of ammunition and display a ballistic trajectory corresponding to the first type of ammunition in the virtual environment. The apparatus may further include a processing module, configured to determine, according to the first shooting signal, whether the first type of ammunition hits a target. The apparatus may further include the transmission module being further configured to transmit, in a case of determining that the first type of ammunition hits the target, a first display instruction to the first terminal and the second terminal simultaneously, the first display instruction being used for instructing the first terminal and the second terminal to display a hit result of the first type of ammunition to the target in the virtual environment.

An embodiment of this application provides a ballistic trajectory display apparatus in a virtual environment. The apparatus may include a receiving module, configured to receive an ammunition creating instruction transmitted by a server, the ammunition creating instruction being transmitted to at least two terminals simultaneously by the server after receiving a first shooting signal of a first type of ammunition. The apparatus may further include a processing module, configured to create the first type of ammunition according to the ammunition creating instruction. The apparatus may further include a display module, configured to display a ballistic trajectory of the first type of ammunition in the virtual environment. The apparatus may further include the receiving module being further configured to receive a first display instruction transmitted by the server, the first display instruction being transmitted to the at least two terminals simultaneously by the server after determining that the first type of ammunition hits a target. The display module may be further configured to display a hit result of the first type of ammunition to the target according to the first display instruction in the virtual environment. The at least two terminals may include a first terminal transmitting the first shooting signal and a second terminal displaying the same virtual environment and corresponding to the first terminal.

An embodiment of this application provides a ballistic trajectory display apparatus in a virtual environment, the apparatus being a second terminal or a part of the second terminal. The apparatus may include a receiving module, configured to receive a second shooting signal of a second type of ammunition transmitted by a server. The apparatus may further include a processing module, configured to create the second type of ammunition according to the second shooting signal, and determine an acceleration of the second type of ammunition. The apparatus may further include a display module, configured to display a ballistic trajectory of the second type of accelerated ammunition according to the acceleration in the virtual environment. The receiving module may be further configured to receive a second display instruction transmitted by the server. The display module may be further configured to display a hit result of the second type of ammunition to a target according to the second display instruction in the virtual environment.

An embodiment of this application further provides a ballistic trajectory display device in a virtual environment. The device may include a processor and a memory. The memory may store at least one instruction, and the instruction may be loaded and executed by the processor to implement the foregoing ballistic trajectory display method in a virtual environment.

An embodiment of this application further provides a computer-readable storage medium that may store at least one instruction. The instruction may be loaded and executed by a processor to implement the foregoing ballistic trajectory display method in a virtual environment.

BRIEF DESCRIPTION OF THE DRAWINGS

To describe the technical solutions of the embodiments of this application more clearly, the accompanying drawings for illustrating the embodiments are described briefly in the following. The drawings in the following description are only some embodiments of this application, and a person of ordinary skill may derive other embodiments based on the accompanying drawings.

DESCRIPTION OF EMBODIMENTS

Figure 1:
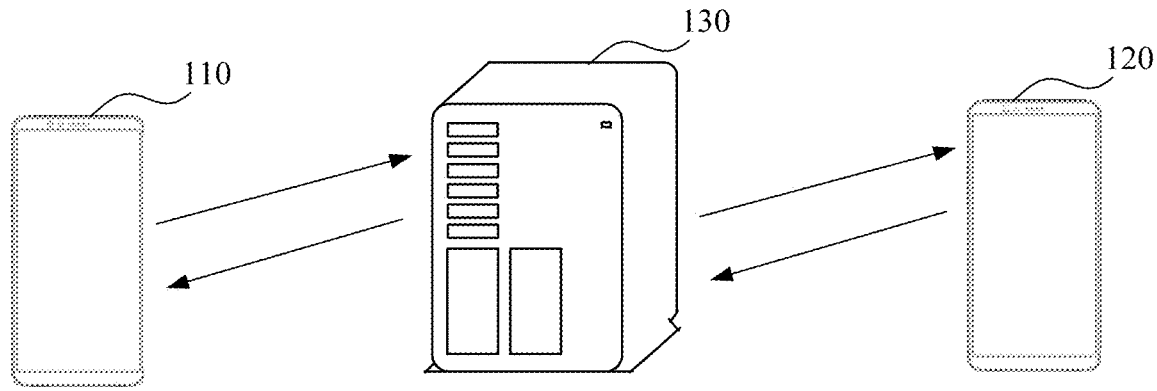
FIG. 1 is a block diagram of a computer system according to some embodiments.

To clarify the technical solutions and advantages of this disclosure, the following further describes the implementations of this application in detail with reference to the accompanying drawings.

A virtual environment may refer to a two-dimensional virtual environment, a 2.5-dimensional virtual environment, or a three-dimensional virtual environment provided (or displayed) by an application program when run on a terminal. The virtual environment may be a simulated environment of a real world, or may be a semi-simulated semi-fictional environment, or may be an entirely fictional environment.

A virtual object may refer to a movable object in a virtual environment. The movable object may be a virtual character, a virtual animal, a cartoon character, or the like. A user may control a virtual object by using a peripheral component or tapping a touch display screen. Each virtual object has a shape and a volume in the virtual environment, and occupies some space in the virtual environment. A virtual object controlled by a first terminal is referred to as 1P, a copy of the virtual object in a server is referred to as 2P, and a copy of the virtual object in a second terminal is referred to as 3P.

Ammunition may refer to ammunition of a ranged weapon used by a virtual object in a virtual environment. For example, the user controls the virtual object to use a gun to attack a target, and bullets of the gun are a type of ammunition; for another example, the user controls the virtual object to use a grenade to attack a target, and the grenade is also a type of virtual ranged ammunition. The target is a virtual object in the virtual environment.

A ballistic trajectory may refer to a ballistic trajectory of ammunition in the virtual environment. For example, the virtual object controlled by the user uses a gun to fire at the target and hits the target, and images in which a bullet flies out of a muzzle of the gun until the bullet flies onto the target and that are displayed on a user interface are a trajectory. In this scene, a trajectory of a bullet is approximately a straight line. For another example, the virtual object controlled by the user uses a grenade to throw at a target and hits the target, and images in which a grenade flies out of a hand of the virtual object and hits the target in a parabola form and that are displayed on the user interface are the trajectory.

Hit reporting may refer to a terminal detecting whether local ammunition hits a target, and reporting hit information to a server in a case of determining that the ammunition hits the target.

A hit check may refer to the server performing a validity check on the hit information reported by the terminal. For example, the user may install a cheating program on the terminal to tamper with a hit rate of ammunition, and the server detects whether the hit information of the ammunition is tampered with; and if yes, the hit information is invalid; otherwise, the hit information is valid.

A shooting anticipation animation may refer to an animation of preparation actions before a virtual character uses a ranged weapon to shoot ammunition. For example, the virtual character uses a grenade to throw at a target, and before the grenade leaves a hand of the virtual character, the virtual character performs actions of holding up the grenade, leaning backward, and then throwing forward, and this series of actions played in an animation form are the shooting anticipation animation of throwing the grenade. The shooting anticipation animation may alleviate a feeling of the user for a communication latency between the terminal and the server, and ensure the coherence of displayed images.

In various embodiments, modules may include circuitry. For example, a module may include a processor and memory. The memory may include instructions configured to implement various functions of the module when executed by the processor. Other circuitry structures, including hardware, may be implemented.

FIG. 1 shows a block diagram of a computer system according to some embodiments. As shown in FIG. 1, the system includes: a first terminal 110, a second terminal 120, and a server 130. The first terminal 110 and the second terminal 120 may be respectively communicatively connected to the server 130 by using a wired network or a wireless network.

An application program used for displaying a virtual environment is installed on the first terminal 110. When the first terminal 110 runs the application program, a first user creates and controls, through the application program, a virtual object in a virtual environment provided by the server 130, and the virtual object is displayed in a user interface of the application program.

The server 130 stores related data of the virtual environment. The first user views material, through the application program run on the first terminal 110, the virtual environment provided by the server 130, and creates and controls a virtual object in the virtual environment, where the virtual object may move in the virtual environment.

An application program used for displaying a virtual environment is installed on the second terminal 120. When the second terminal 120 runs the application program, a second user may view, in a user interface of the application program, a virtual environment and the virtual object created by the first user. The second terminal 120 may further display a virtual object provided by the server in advance in the virtual environment. There may be one or more second terminals 120.

The terminal in some embodiments may be a mobile phone, a tablet computer, an ebook reader, a moving picture experts group audio layer III (MP3) player, a moving picture experts group audio layer IV (MP4) player, a laptop portable computer, a desktop computer, or the like. The terminal in some embodiments may be a terminal provided with a display capability and including a touch display screen or a common display screen. The terminal in some embodiments may be further provided with a peripheral component, and the user may control the virtual object by using the peripheral component. The peripheral component may be at least one of a joystick peripheral, a gun input peripheral, and a touch screen assistance peripheral.

In some embodiments, the foregoing application program is any one of a military simulation program, a first-person shooting (FPS) game program, a third-person shooting (TPS) game program, and another application program provided with a shooting element. The TPS game program may be further classified into a third-person quarter-view shooting game program and a third-person horizontal-view shooting game program. The third-person horizontal-view shooting game program is a game program viewed from a left side or a right side of the virtual character, such as a Contra game program.

In some embodiments, the first terminal transmits an ammunition shooting signal to the server and displays a first ballistic trajectory of the ammunition on the first terminal, the server forwards the ammunition shooting signal to the second terminal, and the second terminal displays a second ballistic trajectory of the ammunition according to the ammunition shooting signal transmitted by the server. The first terminal reports hit information to the server after determining that the ammunition hits the target, and the server performs a validity check on the hit information. In a case that the hit information is valid, the server respectively transmits a damage display instruction to the first terminal and the second terminal, and the first terminal and the second terminal display, according to the damage display instruction transmitted by the server, that the target is damaged. Because there is a network latency between the first terminal and the server, and there is also a network latency between the second terminal and the server, the second ballistic trajectory is displayed later than the first ballistic trajectory, and on the second terminal, an abnormal picture displaying that the target is damaged in a case that the ammunition has not moved to the target along the second ballistic trajectory may appear.

Figure 2:
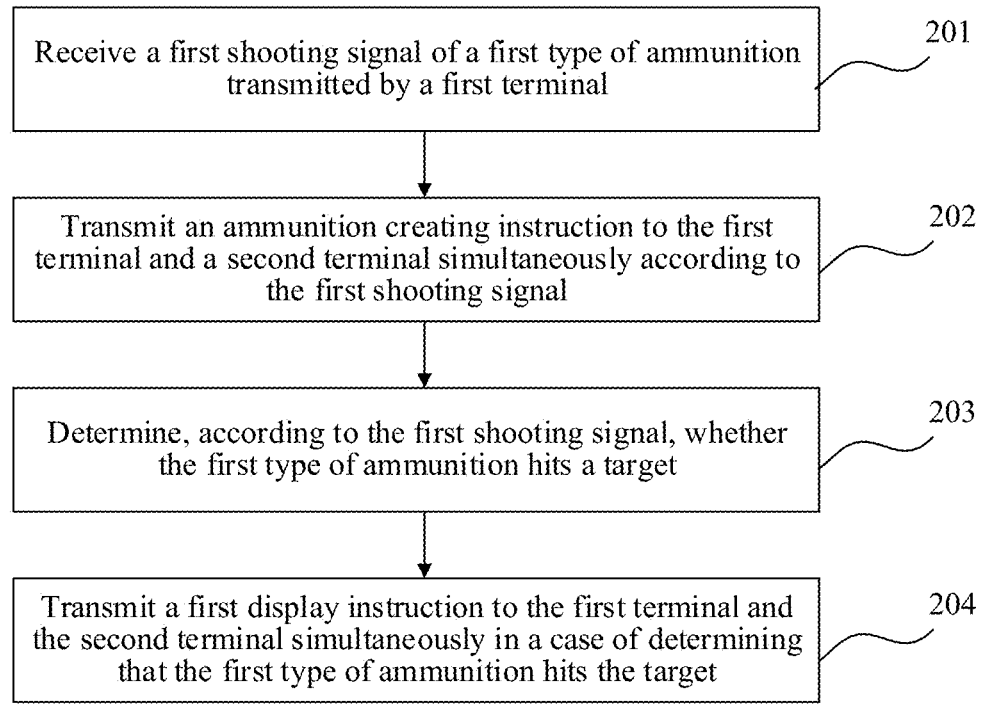
FIG. 2 is a method flowchart of a ballistic trajectory display method in a virtual environment according to some embodiments.

FIG. 2 shows a flowchart of a ballistic trajectory display method in a virtual environment according to some embodiments of this application. The method is performed by a server.

The method may include receiving a first shooting signal of a first type of ammunition transmitted by a first terminal (201).

The server receives a first shooting signal transmitted by a first terminal. The first shooting signal is a shooting signal corresponding to the first type of ammunition, and a first user may trigger the first shooting signal by operating a joystick, or trigger the first shooting signal by touching a control element corresponding to the first type of ammunition on a touch screen of the first terminal.

In some embodiments, the first type of ammunition is ammunition of which a speed is less than a first speed threshold. The first type of ammunition is projection-type ammunition, such as a grenade, a hand grenade, a stone, or a dart.

The method may include transmitting an ammunition creating instruction to the first terminal and a second terminal simultaneously according to the first shooting signal (202).

The terminal transmits an ammunition creating instruction to the first terminal and a second terminal simultaneously according to the first shooting signal. The ammunition creating instruction is used for instructing the first terminal and the second terminal to create the first type of ammunition and display a ballistic trajectory corresponding to the first type of ammunition in the virtual environment.

In some embodiments, after the first terminal receives the ammunition creating instruction, the first terminal creates the first type of ammunition in a background process, and the first type of ammunition includes parameters such as coordinates in the virtual environment, a volume occupied in the virtual environment, and a moving state (for example, a moving speed and a moving direction). In a case that the first type of ammunition is created in the background process, the first terminal displays a first ballistic trajectory of the first type of ammunition in the virtual environment on a display interface of an application program. Similarly, after the second terminal receives the ammunition creating instruction, the second terminal creates the first type of ammunition in a background process and displays the ballistic trajectory of the first type of ammunition in the virtual environment.

The method may include determining, according to the first shooting signal, whether the first type of ammunition hits a target (203).

In some embodiments, the server create the first type of ammunition according to the first shooting signal, and the first type of ammunition includes parameters such as coordinates in the virtual environment, a volume occupied in the virtual environment, and a moving state (for example, a moving speed and a moving direction). The server may determine, according to the moving state parameter of the first type of ammunition and the volume occupied by the target in the virtual environment and the moving state parameter of the target, whether the first type of ammunition hits the target.

The method may include transmitting a first display instruction to the first terminal and the second terminal simultaneously in a case of determining that the first type of ammunition hits the target (204).

After determining that the first type of ammunition hits the target, the server transmits a first display instruction to the first terminal and the second terminal simultaneously. The first display instruction is used for instructing the first terminal and the second terminal to display a hit result of the first type of ammunition to the target in the virtual environment, and the hit result refers to damage of the first type of ammunition to the target.

Based on the above, in this embodiment, the first shooting signal of the first type of ammunition is transmitted to the server by the first terminal. After the server receives the first shooting signal, the server transmits the ammunition creating instruction to the first terminal and the second terminal simultaneously The server transmits the first display instruction to the first terminal and the second terminal simultaneously after determining that the first type of ammunition hits the target. Because the ammunition creating instruction and the first display instruction are transmitted by the server to the first terminal and the second terminal simultaneously, a problem in the related art that a picture of displaying the damage is earlier than a picture that the ammunition hits the target in the second terminal is resolved or alleviated, so that the ballistic trajectories and damage interfaces displayed in the first terminal and the second terminal are totally synchronous or basically synchronous, thereby improving the accuracy of displaying a shooting ballistic trajectory of the ammunition.

Figure 3:
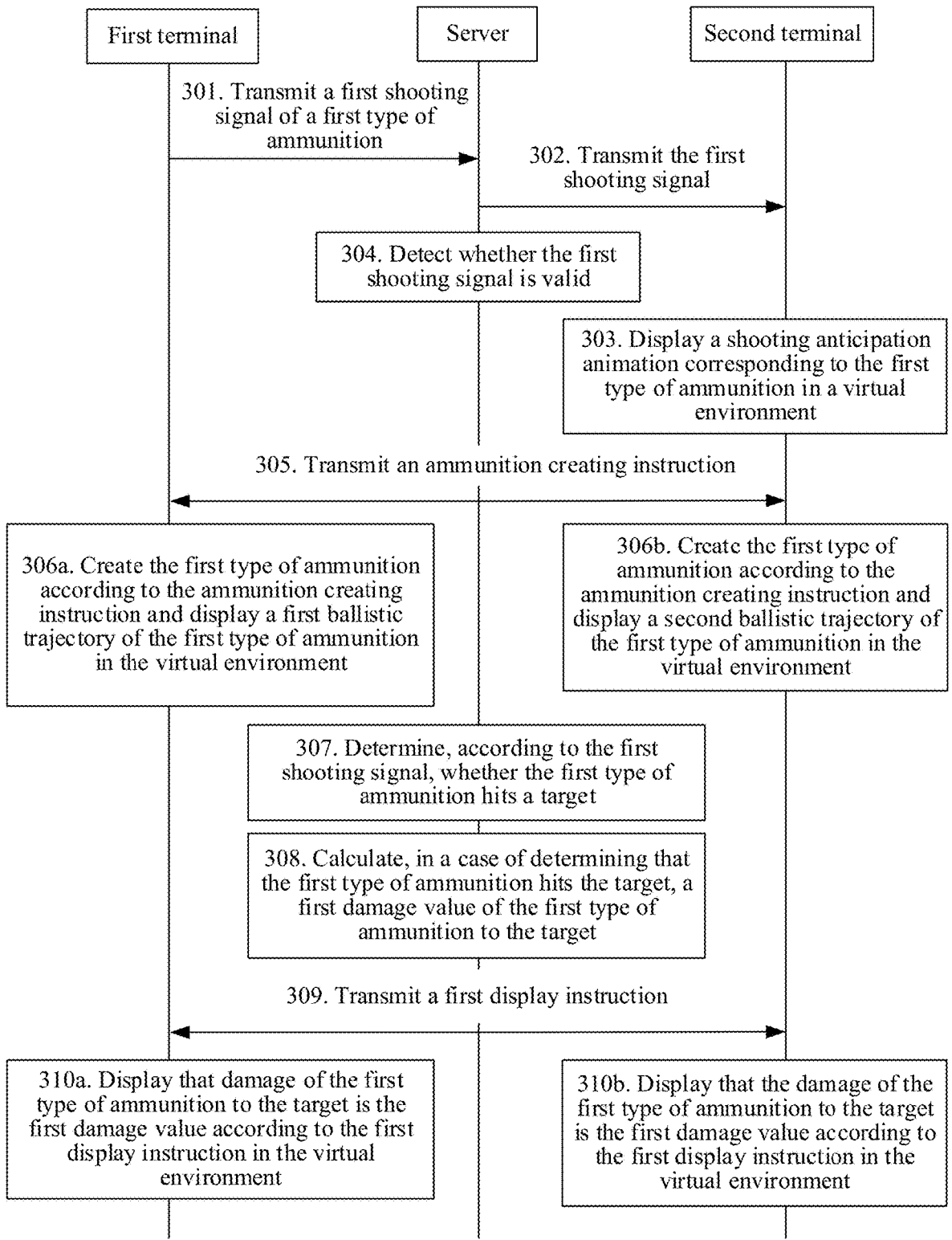
FIG. 3 is a method flowchart of a ballistic trajectory display method in a virtual environment according to some embodiments.

FIG. 3 shows a method flowchart of a ballistic trajectory display method in a virtual environment according to some embodiments of this application. Description is made in this embodiment by using an example in which the method is applied to the implementation environment shown in FIG. 1.

The method may include a first terminal transmitting a first shooting signal of a first type of ammunition to a server (301).

The first shooting signal is a shooting signal corresponding to the first type of ammunition, and a first user may trigger the first shooting signal on the first terminal by operating a joystick, or trigger the first shooting signal by touching a control element corresponding to the first type of ammunition on the first terminal.

In some embodiments, the first type of ammunition is ammunition of which a speed is less than a first speed threshold. The first type of ammunition is projection-type ammunition or tracking-type ammunition, such as a grenade, a hand grenade, a stone, a dart, or a heat seeking rocket launcher.

In some embodiments, the ammunition has a corresponding speed. A first speed threshold is a relatively small preset speed value, a speed of the ammunition of which the speed is less than the first speed threshold is relatively low, and generally, the ammunition is projection-type ammunition having a parabola-shaped ballistic trajectory, or ammunition having a tracking effect.

In some embodiments, after the first terminal receives the first shooting signal, the first terminal plays a shooting anticipation animation corresponding to the first type of ammunition in the virtual environment.

Before receiving the ammunition creating instruction transmitted by the server, the first terminal does not create ammunition or display a first ballistic trajectory of the ammunition, so that in a process of waiting for the ammunition creating instruction, the first terminal may play the shooting anticipation animation of the first type of ammunition, to prevent the user from being conscious of the waiting time.

Figure 4:
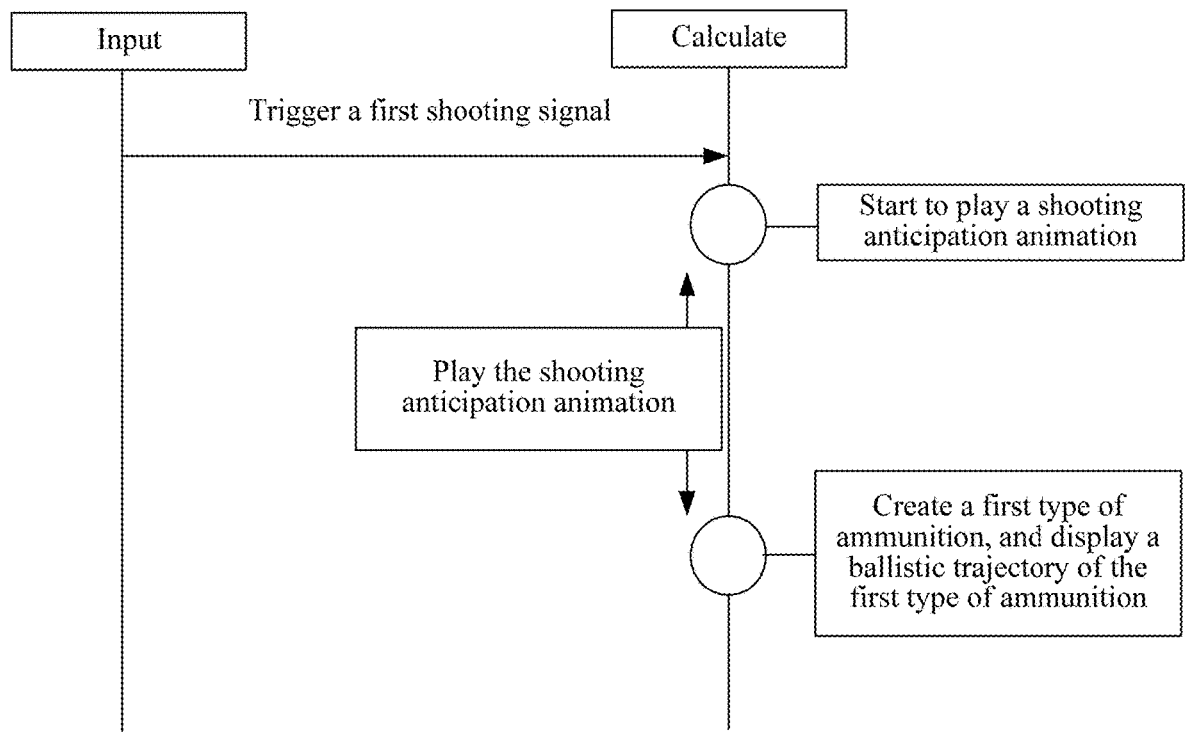
FIG. 4 is a schematic diagram of a shooting process of a first type of ammunition according to some embodiments.

FIG. 4 shows an ammunition shooting process from receiving, by the first terminal, the first shooting signal to displaying the first ballistic trajectory of the first type of ammunition. The first terminal displays the shooting anticipation animation of the first type of ammunition in a time interval of waiting for the ammunition creating instruction, to prevent the user from being conscious of the waiting time interval.

The process may include the server forwarding the first shooting signal to a second terminal (302).

After receiving the first shooting signal, the server forwards the first shooting signal to a second terminal.

The process may include, after receiving the first shooting signal, the second terminal plays a shooting anticipation animation corresponding to the first type of ammunition in a virtual environment.

In some embodiments, after receiving a first shooting signal corresponding to a grenade, the second terminal plays a shooting anticipation animation corresponding to the grenade, and the shooting anticipation animation is an animation of actions of holding up the grenade, leaning backward, and then throwing forward that are performed by the virtual object.

Similarly, before receiving the ammunition creating instruction transmitted by the server, the second terminal does not create ammunition or display a second ballistic trajectory of the ammunition, so that the second terminal plays the shooting anticipation animation of the first type of ammunition in a time interval of waiting for the ammunition creating instruction, to prevent the user from being conscious of the waiting time interval.

The process may include the server detecting whether the first shooting signal is valid (304).

The server detects whether the first shooting signal is valid. In a case that the first shooting signal is valid, the process may proceed to 305; and in a case that the first shooting signal is invalid, the process may proceed to 306.

In some embodiments, the server detects whether the first shooting signal is valid. The detection may include the server detecting whether the remaining quantity of the first type of ammunition of the virtual object in the first terminal is greater than 0. In a case that the remaining quantity is greater than 0, it is determined that the first shooting signal is valid In a case that the remaining quantity is equal to 0, it is determined that the first shooting signal is invalid.

In some embodiments, the server detects whether the first shooting signal is valid. The server detects whether an energy value of the first type of ammunition of the virtual object in the first terminal reaches a preset value. In a case that the energy value is greater than or equal to the preset value, it is determined that the first shooting signal is valid. In a case that the energy value is less than the preset value, it is determined that the first shooting signal is invalid.

In a case that the first shooting signal is valid, the server transmits an ammunition creating instruction to the first terminal and the second terminal simultaneously (305).

After determining that the first shooting signal is valid, the server transmits an ammunition creating instruction to the first terminal and the second terminal simultaneously. The ammunition creating instruction is used for instructing the first terminal and the second terminal to create the first type of ammunition and display a ballistic trajectory of the first type of ammunition.

The first terminal creates the first type of ammunition according to the ammunition creating instruction and displays a first ballistic trajectory of the first type of ammunition in the virtual environment (306a).

In some embodiments, after the first terminal receives the ammunition creating instruction, the first terminal creates the first type of ammunition in a background process, and the first type of ammunition includes parameters such as coordinates in the virtual environment, a volume occupied in the virtual environment, and a moving state (for example, a moving speed and a moving direction). In a case that the first type of ammunition is created in the background process, the first terminal displays a ballistic trajectory of the first type of ammunition in the virtual environment on a display interface of an application program.

The second terminal creates the first type of ammunition according to the ammunition creating instruction and displays a ballistic trajectory of the first type of ammunition in the virtual environment (306b).

In some embodiments, after the second terminal receives the ammunition creating instruction, the second terminal creates the first type of ammunition in a background process, and the first type of ammunition includes parameters such as coordinates in the virtual environment, a volume occupied in the virtual environment, and a moving state (for example, a moving speed and a moving direction). After the first type of ammunition is created in the background process, the second terminal displays a ballistic trajectory of the first type of ammunition in the virtual environment on a display interface of an application program.

The server determines, according to the first shooting signal, whether the first type of ammunition hits a target (307).

In some embodiments, the server create the first type of ammunition according to the first shooting signal, and the first type of ammunition includes parameters such as coordinates in the virtual environment, a volume occupied in the virtual environment, and a moving state (for example, a moving speed and a moving direction). The server may determine, according to the moving state parameter of the first type of ammunition and the volume occupied by the target in the virtual environment and the moving state parameter of the target, whether the first type of ammunition hits the target.

The server calculates, in a case of determining that the first type of ammunition hits the target, a first damage value of the first type of ammunition to the target (308).

In some embodiments, the server calculates, according to a moving speed and a specific type of the first type of ammunition, a first damage value caused by the hit of the first type of ammunition to the target. For example, a first damage value of a grenade to the target is calculated according to the grenade and a moving speed corresponding to the grenade, or a first damage value of shrapnel to the target is calculated according to the shrapnel and a moving speed corresponding to the shrapnel.

In some embodiments, the server calculates, according to a moving speed of the first type of ammunition, a specific type of the first type of ammunition, and a defense value of the target, a first damage value caused by the hit of the first type of ammunition to the target. The defense value of the target may be at least one of armor of the target, a dodge probability of the target, and an obstacle between the first type of ammunition and the target.

The server transmits a first display instruction to the first terminal and the second terminal simultaneously (309).

After determining that the first type of ammunition hits the target, the server transmits a first display instruction to the first terminal and the second terminal simultaneously, where the first display instruction carries the first damage value.

The first terminal displays that the damage of the first type of ammunition to the target is the first damage value according to the first display instruction in the virtual environment (310a).

After receiving the first display instruction and the first damage value carried in the first display instruction, the first terminal displays that a hit result of the first type of ammunition to the target is the first damage value in the virtual environment. That is, the damage of the first type of ammunition to the target is the first damage value.

In some embodiments, in a case of receiving the damage value 125 carried in the first display instruction, the first terminal displays text of "−125" above the target.

In some embodiments, the first terminal plays, according to the first display instruction, an animation that the target is hit by the first type of ammunition.

In some embodiments, after receiving the first display instruction and the first damage value 125 carried in the first display instruction, the first terminal displays an animation that the target flickers or becomes red in the virtual environment, and displays text of "−125" above the target.

In some embodiments, the first terminal further plays, according to the first display instruction in the virtual environment, an animation that the target is hit by the first type of ammunition.

The second terminal displays that the damage of the first type of ammunition to the target is the first damage value according to the first display instruction in the virtual environment (310b).

After receiving the first display instruction and the first damage value carried in the first display instruction, the second terminal displays that a hit result of the first type of ammunition to the target is the first damage value in the virtual environment. That is, the damage of the first type of ammunition to the target is the first damage value.

In some embodiments, in a case of receiving the damage value 125 carried in the first display instruction, the second terminal displays text of "−125" above the target.

In some embodiments, the second terminal further plays, according to the first display instruction in the virtual environment, an animation that the target is hit by the first type of ammunition.

In some embodiments, after receiving the first display instruction and the first damage value 125 carried in the first display instruction, the second terminal displays an animation that the target flickers or becomes red, and displays text of "−125" above the target.

Based on the above, in this embodiment, the first shooting signal of the first type of ammunition is transmitted to the server by the first terminal; after the server receives the first shooting signal, the server transmits the ammunition creating instruction to the first terminal and the second terminal simultaneously; and the server transmits the first display instruction to the first terminal and the second terminal simultaneously after determining that the first type of ammunition hits the target. Because the ammunition creating instruction and the first display instruction are transmitted by the server to the first terminal and the second terminal simultaneously, a problem in the related art that a picture of displaying the damage is earlier than a picture that the ammunition hits the target in the second terminal is resolved or alleviated, so that the ballistic trajectories and damage interfaces displayed in the first terminal and the second terminal are totally synchronous or basically synchronous, thereby improving the accuracy of displaying a shooting ballistic trajectory of the ammunition.

Further, in this embodiment, the first terminal and the second terminal display the shooting anticipation animation of the first type of ammunition while waiting for the ammunition creating instruction, to prevent the user from being conscious of the waiting time interval, thereby improving the accuracy of the shooting display of the virtual object.

Further, in this embodiment of this application, the server detects whether the first shooting signal is valid, and transmits the ammunition creating instruction to the first terminal and the second terminal simultaneously after determining that the first shooting signal is valid, to resolve the problem that in a scene in which the virtual object cannot shoot the first type of ammunition or in a scene in which the virtual object uses a cheating program, the user can still operate the virtual object to shoot the first type of ammunition, thereby improving the accuracy of the shooting display of the virtual object.

Further, in this embodiment of this application, the first damage value of the first type of ammunition to the target is calculated by the server, and the first damage value is carried in the first display instruction. The first terminal and the second terminal display, according to the first damage value carried in the first display instruction, that the damage of the first type of ammunition to the target is the first damage value, so that a hit effect of the hit target is improved.

Further, in this embodiment of this application, the first terminal and the second terminal play, according to the first display instruction transmitted by the server, an animation that the target is hit by the first type of ammunition, so that a hit effect of the hit target is improved.

The ammunition in the virtual environment may be classified into projection-type ammunition and instantaneous-shooting-type ammunition according to speeds.

Figure 5A:
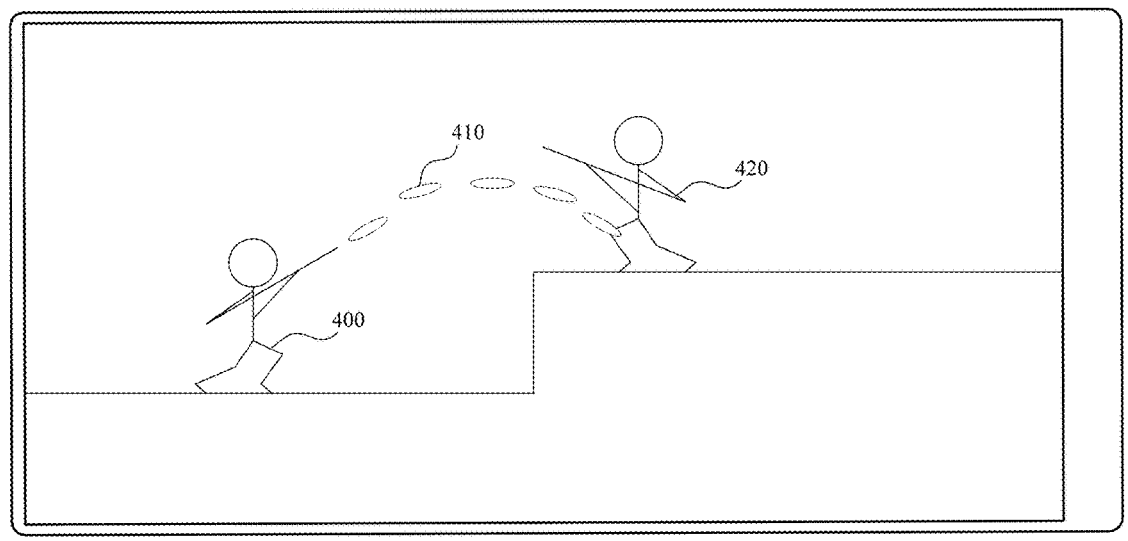
FIG. 5A is a schematic diagram of displaying a ballistic trajectory of projection-type ammunition according to some embodiments.

The first type of ammunition is projection-type ammunition, and a speed of the ammunition is less than a first speed threshold, where the first speed threshold is a relatively small speed value. Generally, as shown in FIG. 5A, a ballistic trajectory of projection-type ammunition 410 shot by a virtual object 400 is not a straight line, and the projection-type ammunition 410 needs to run for a relatively long time in a virtual environment to hit a target 420.

Figure 5B:
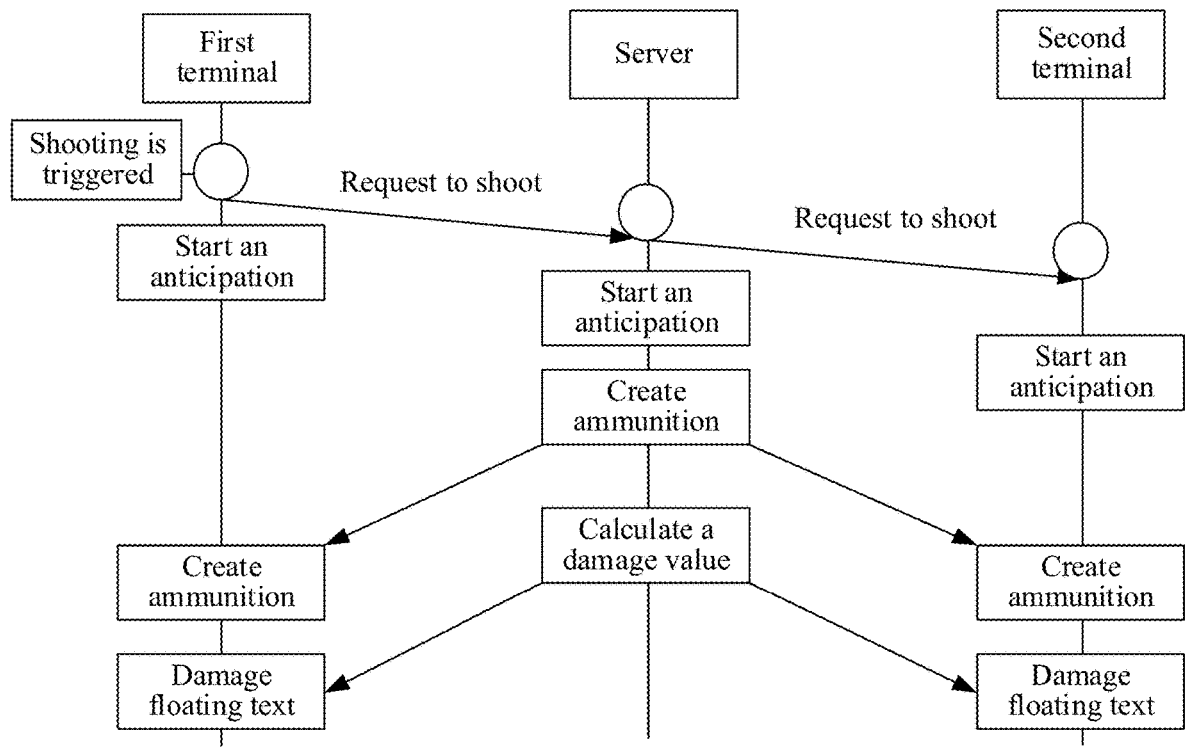
FIG. 5B is a schematic diagram of a projection-type synchronization model according to some embodiments.

FIG. 5B shows an example projection-type synchronization model. In a case that a shooting button of the projection-type ammunition is triggered, the first terminal starts to play a shooting anticipation animation while requesting the first shooting signal from the server, and the second terminal starts to play the shooting anticipation animation after the server forwards the first shooting signal to the second terminal. While the second terminal plays the shooting anticipation animation, the server creates projection-type ammunition, and transmits the ammunition creating instruction to the first terminal and the second terminal simultaneously. The first terminal and the second terminal create the projection-type ammunition after receiving the ammunition creating instruction, and display a ballistic trajectory of the projection-type ammunition in a user interface. Then the server calculates damage of the projection-type ammunition to a target, and transmits a damage floating text instruction to the first terminal and the second terminal simultaneously according to a damage value obtained through calculation. Although the latency between the first terminal and the server and the latency between the second terminal and the server are different, the two latencies may be with a tolerance different, so that the ballistic trajectories respectively displayed by the first terminal and the second terminal similar such that the effect of the latency difference is imperceptible or nearly imperceptible.

Figure 5C:
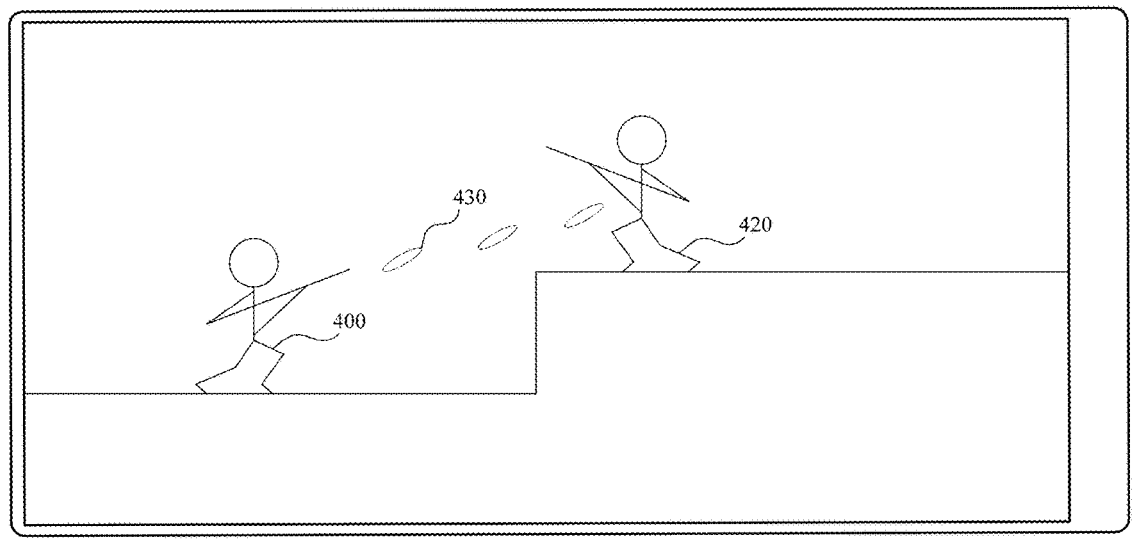
FIG. 5C is a schematic diagram of displaying a ballistic trajectory of instantaneous-shooting-type ammunition according to some embodiments.

Second type of ammunition is instantaneous-shooting-type ammunition, and a speed of the ammunition is greater than a second speed threshold. The second speed threshold is a relatively large speed value. Generally, as shown in FIG. 5C, a ballistic trajectory of instantaneous-shooting-type ammunition 430 shot by a virtual object 400 is a straight line, and the instantaneous-shooting-type ammunition 430 can hit a target 420 by running for a relatively short time in a virtual environment.

Figure 5D:
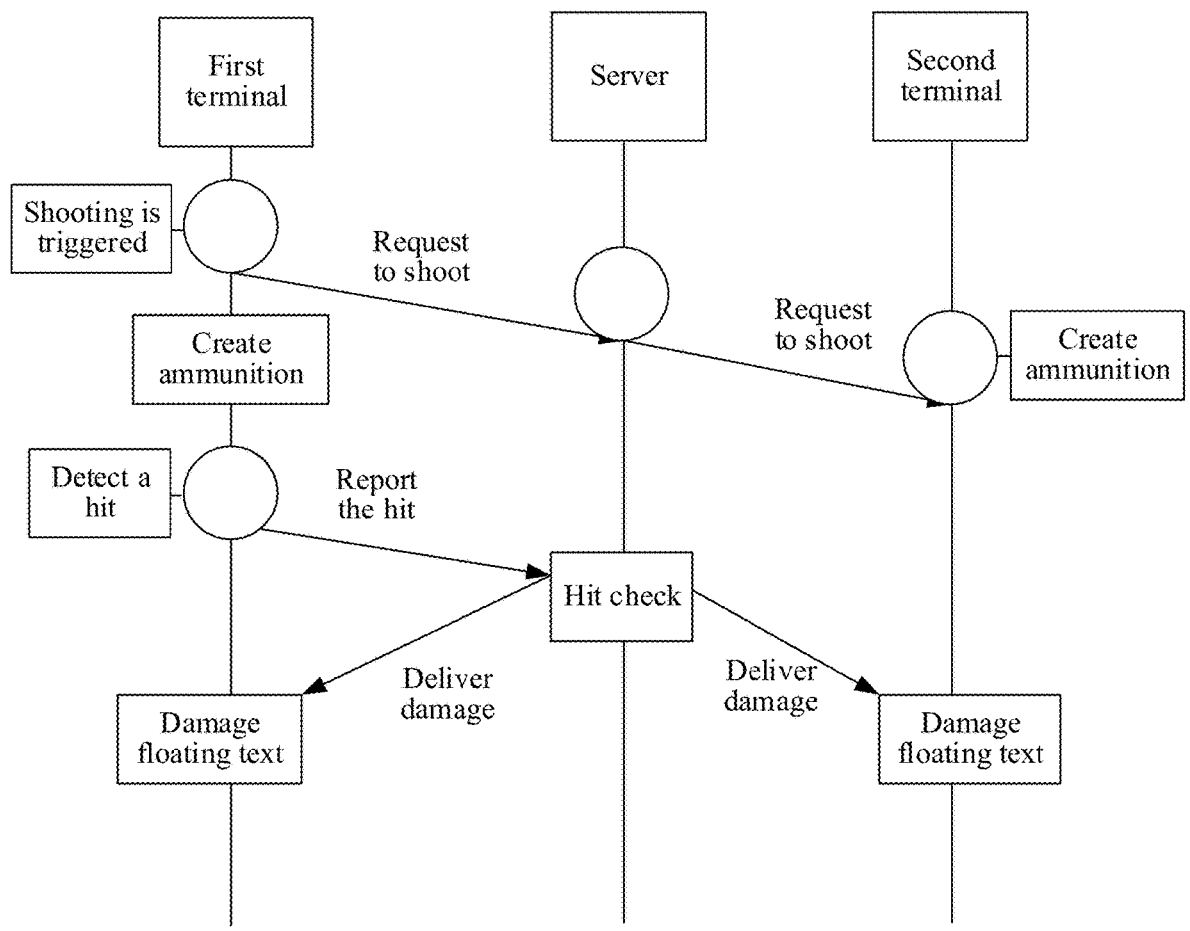
FIG. 5D is a schematic diagram of an instantaneous-shooting-type synchronization model according to some embodiments.

FIG. 5D is an instantaneous-shooting-type synchronization model. In a case that the instantaneous-shooting-type ammunition is triggered, the first terminal creates the instantaneous-shooting-type ammunition while transmitting a second shooting signal to the server, the server forwards the second shooting signal to the second terminal, and the second terminal creates the instantaneous-shooting-type ammunition according to the second shooting signal. The first terminal detects whether the instantaneous-shooting-type ammunition hits a target, and reports a hit event to the server in a case that the ammunition hits the target. The server performs a validity check on the hit event, calculates a damage value of the instantaneous-shooting-type ammunition to the target in a case that the hit is valid, and transmits a damage floating text instruction to the first terminal and the second terminal simultaneously according to the damage value.

The example embodiments in FIG. 2 and FIG. 3 are embodiments corresponding to the projection-type synchronization model, and the instantaneous-shooting-type synchronization model is described below.

Figure 6:
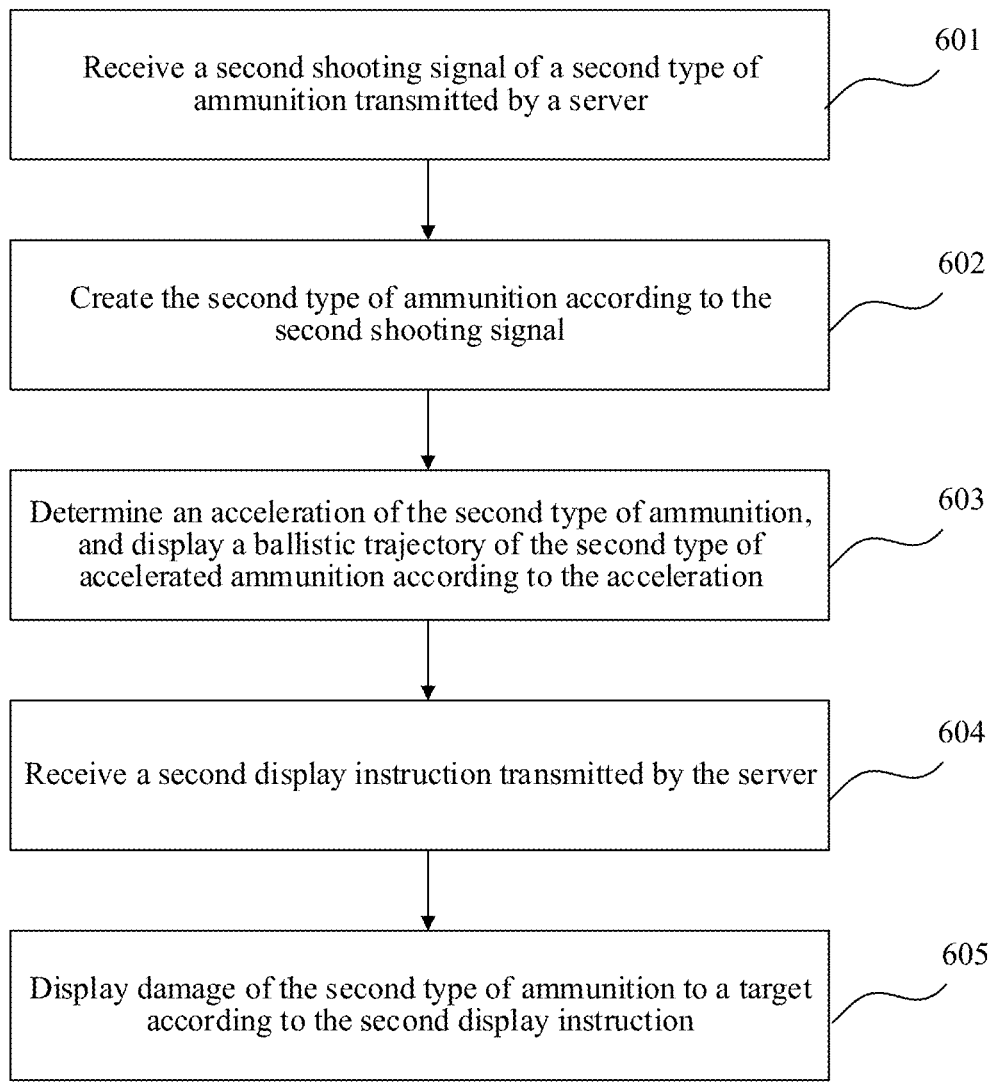
FIG. 6 is a method flowchart of a ballistic trajectory display method in a virtual environment according to some embodiments.

FIG. 6 shows a method flowchart of a ballistic trajectory display method in a virtual environment according to some embodiments. Description is made in this embodiment by using an example in which the method may be applied to a second terminal.

The method may include receiving a second shooting signal of a second type of ammunition transmitted by a server (601).

The second shooting signal is a shooting signal corresponding to the second type of ammunition, and the first user may trigger the second shooting signal on the first terminal by operating a peripheral component, or trigger the second shooting signal by touching a control element corresponding to the second type of ammunition on a touch screen of the first terminal. After receiving the second shooting signal, the first terminal transmits the second shooting signal to the server, the server forwards the second shooting signal to the second terminal, and the second terminal receives the second shooting signal transmitted by the server.

In some embodiments, the second type of ammunition is ammunition of which a speed is greater than a second speed threshold.

In some embodiments, the second speed threshold is a relatively large preset speed value, a speed of the ammunition of which the speed is greater than the second speed threshold is relatively high, and the ammunition is generally instantaneous-shooting-type ammunition (for example, gun bullet or laser) having a straight-line shaped trajectory.

The method may include creating the second type of ammunition according to the second shooting signal (602).

In some embodiments, after receiving the second shooting signal, the second terminal creates the second type of ammunition in a background process, and the second type of ammunition includes parameters such as coordinates in the virtual environment, a volume occupied in the virtual environment, and a moving state (for example, a moving speed and a moving direction). In a case that the second type of ammunition is created in the background process, the second terminal displays a second ballistic trajectory of the second type of ammunition in the virtual environment on a display interface of an application program.

The method may include determining an acceleration of the second type of ammunition, and display a second ballistic trajectory of the second type of accelerated ammunition according to the acceleration (603).

In some embodiments, the second terminal needs to create the second type of ammunition after the server forwards the second shooting signal, so that a time used for the second terminal to create the second type of ammunition is later than the first terminal. To keep the ballistic trajectories of the second type of ammunition respectively displayed by the second terminal and the first terminal as synchronous as possible in a case of hitting the target, the second terminal may accelerate a flying speed of the second type of ammunition.

In this case, the second terminal may need to determine the acceleration of the second type of ammunition, to obtain a second type of accelerated ammunition, and displays a ballistic trajectory of the second type of accelerated ammunition. In some embodiments, the acceleration is a preset value, or the acceleration is a value dynamically determined according to the network latency.

The method may include receiving a second display instruction transmitted by the server (604).

The second terminal receives a second display instruction transmitted by the server.

The method may include displaying a hit result of the second type of ammunition to a target according to the second display instruction (605).

The second terminal displays a hit result of the second type of ammunition to a target according to the second display instruction transmitted by the server, and the hit result refers to damage of the second type of ammunition to the target.

Based on the above, in this embodiment of this application, the second terminal determines the acceleration of the second type of ammunition, and displays the ballistic trajectory of the second type of accelerated ammunition according to the acceleration, to resolve the problem that the time used for the second terminal to create the second type of ammunition is later than the first terminal. Consequently, the time used for the ballistic trajectory of the second type of ammunition to hit the target and displayed by the second terminal is not synchronous with the first terminal, thereby improving the accuracy of the shooting display of the virtual object.

Figure 7:
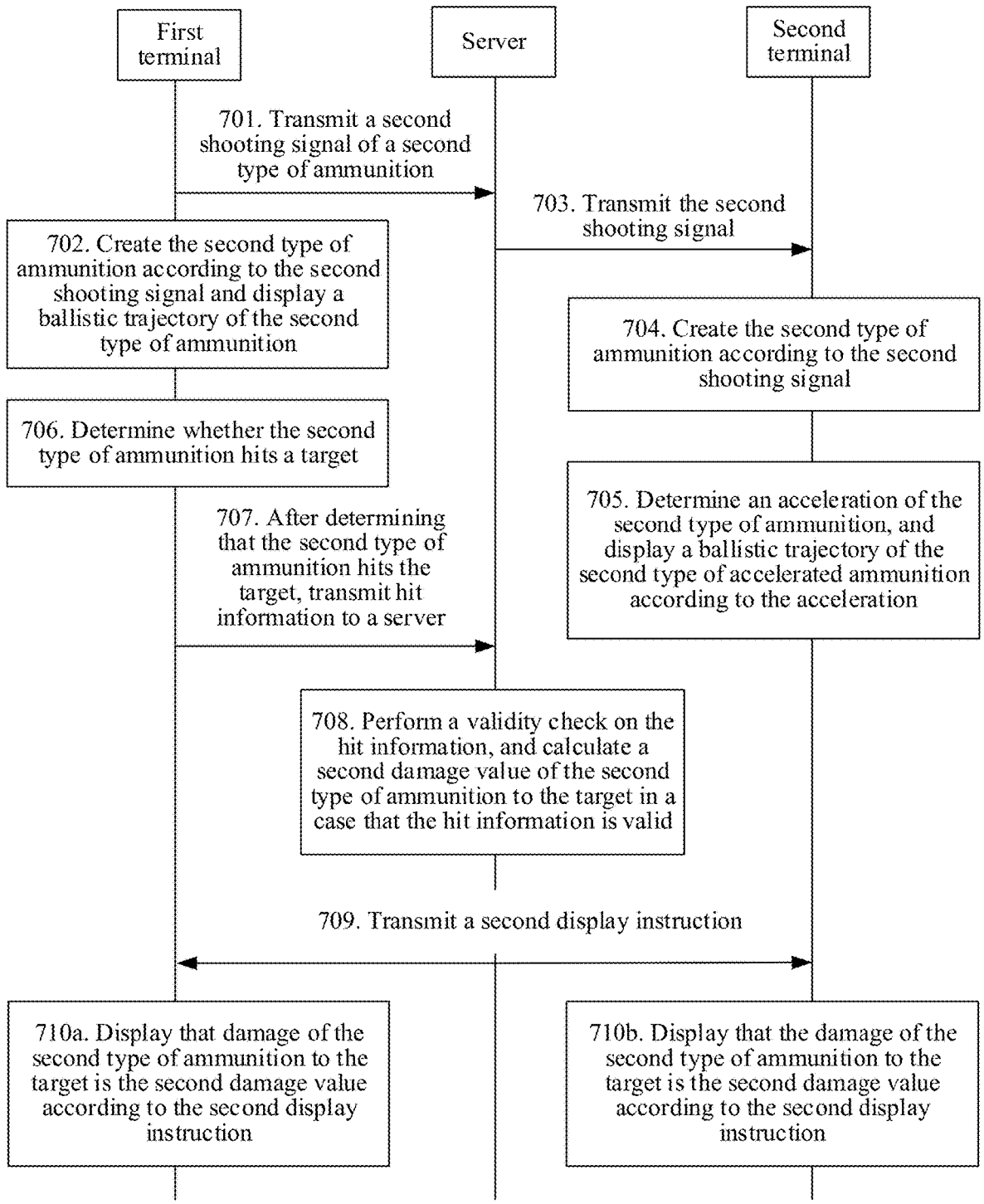
FIG. 7 is a method flowchart of a ballistic trajectory display method in a virtual environment according to some embodiments.

FIG. 7 shows a method flowchart of a ballistic trajectory display method in a virtual environment according to some embodiments. Description is made in this embodiment by using an example in which the method is applied to the implementation environment shown in FIG. 1, and the method includes:

A first terminal transmits a second shooting signal of a second type of ammunition to a server (701).

The second shooting signal is a shooting signal corresponding to the second type of ammunition, and the first user may trigger the second shooting signal on the first terminal by operating a peripheral component, or trigger the second shooting signal by touching a control element corresponding to the second type of ammunition on the first terminal. After receiving the second shooting signal, the first terminal transmits the second shooting signal to the server.

The first terminal creates the second type of ammunition according to the second shooting signal and displays a ballistic trajectory of the second type of ammunition in a virtual environment (702).

In some embodiments, after receiving the second shooting signal, the first terminal creates the second type of ammunition in a background process, and the second type of ammunition includes parameters such as coordinates in the virtual environment, a volume occupied in the virtual environment, and a moving state (for example, a moving speed and a moving direction). After creating the second type of ammunition, the first terminal displays a first ballistic trajectory of the second type of ammunition in the virtual environment.

The server forwards the second shooting signal to a second terminal.

After receiving the second shooting signal, the server forwards the second shooting signal to the second terminal (703).

In some embodiments, while forwarding the second shooting signal to the second terminal, the server further transmits a first network latency between the first terminal and the server to the second terminal.

In some embodiments, the second terminal needs to create the second type of ammunition after the server forwards the second shooting signal, so that a time used for the second terminal to create the second type of ammunition is later than the first terminal. To keep the ballistic trajectories of the second type of ammunition respectively displayed by the second terminal and the first terminal as synchronous as possible in a case of hitting the target, the second terminal may accelerate a flying speed of the second type of ammunition.

In this case, the second terminal needs to determine an acceleration of the second type of ammunition, and the acceleration may be determined according to the first network latency between the first terminal and the server and a second network latency between the second terminal and the server. Therefore, in an embodiment, the server further transmits the first network latency while forwarding the second shooting signal to the second terminal.

The second terminal creates the second type of ammunition according to the second shooting signal (704).

In some embodiments, after receiving the second shooting signal, the second terminal creates the second type of ammunition in a background process, and the second type of ammunition includes parameters such as coordinates in the virtual environment, a volume occupied in the virtual environment, and a moving state (for example, a moving speed and a moving direction).

Step 705: The second terminal determines an acceleration of the second type of ammunition, and displays a ballistic trajectory of the second type of accelerated ammunition according to the acceleration (705).

In some embodiments, in a case that the server does not transmit the first network latency to the second terminal, the second terminal obtains the second network latency between the second terminal and the server; and determines a first acceleration of the second type of ammunition according to the second network latency, and displays a ballistic trajectory of the second type of accelerated ammunition according to the first acceleration.

In some embodiments, the second terminal obtains the second network latency, and calculates the first acceleration of the second type of ammunition according to the second network latency, to further display a second ballistic trajectory of the second type of accelerated ammunition according to the first acceleration in the virtual environment. Because the first acceleration is obtained through calculation according to the second network latency, the latency in hitting, by the ballistic trajectory of the second type of ammunition, the target in the second terminal may be reduced to some extent.

In some embodiments, in a case that the server transmits the first network latency to the second terminal, the second terminal obtains the second network latency between the second terminal and the server; and determines a second acceleration of the second type of ammunition according to the first network latency and the second network latency, and displays a ballistic trajectory of the second type of accelerated ammunition according to the second acceleration.

In some embodiments, the second terminal obtains the second network latency, and determines the second acceleration of the second type of ammunition according to the first network latency and the second network latency, to further display a second ballistic trajectory of the second type of accelerated ammunition according to the second acceleration in the virtual environment. Because the second acceleration is obtained through calculation according to the first network latency and the second network latency, the latency in hitting, by the ballistic trajectory of the second type of ammunition, the target in the second terminal may be further reduced.

In some embodiments, the second acceleration is greater than the first acceleration.

The first terminal determines, according to the second shooting signal, whether the second type of ammunition hits a target (706).

In some embodiments, the first terminal may determine, according to the moving state parameter of the second type of ammunition and the volume occupied by the target in the virtual environment and the moving state parameter of the target, whether the second type of ammunition hits the target.

After determining that the second type of ammunition hits the target, the first terminal transmits hit information to the server (707).

In some embodiments, the first user may install a cheating program on the first terminal, to tamper with a hit rate of the ammunition, so that the first terminal needs to transmit the hit information to the server to perform a validity check.

The server performs a validity check on the hit information, and calculates a second damage value of the second type of ammunition to the target in a case that the hit information is valid (708).

In some embodiments, the server avoids the cheating program to perform the validity check on the hit information. In a case that the hit information is valid, the second damage value caused by the hit of the second type of ammunition to the target is calculated according to a moving speed and a specific type of the second type of ammunition, such as a bullet and a moving speed corresponding to the bullet, and armor of the target.

A specific check form of the validity check performed by the server is not limited in this embodiment.

The server transmits a second display instruction to the first terminal and the second terminal simultaneously.

The server transmits the second display instruction to the first terminal and the second terminal simultaneously, where the second display instruction carries the second damage value.

The first terminal displays that the damage of the second type of ammunition to the target is the second damage value according to the second display instruction in the virtual environment (710*a*).

After receiving the second display instruction and the second damage value carried in the second display instruction, the first terminal displays that a hit result of the second type of ammunition to the target is the second damage value. That is, the damage of the second type of ammunition to the target is the second damage value.

In some embodiments, in a case of receiving the damage value 84 carried in the first display instruction, the first terminal displays text of "−84" above the target.

In some embodiments, the first terminal plays, according to the second display instruction in the virtual environment, an animation that the target is hit by the second type of ammunition.

In some embodiments, after receiving the second display instruction and the second damage value 84 carried in the second display instruction, the first terminal displays an animation that the target flickers or becomes red, and displays text of "−84" above the target.

The second terminal displays that the damage of the second type of ammunition to the target is the second damage value according to the second display instruction in the virtual environment (710*b*).

After receiving the second display instruction and the second damage value carried in the second display instruction, the second terminal displays that a hit result of the second type of ammunition to the target is the second damage value. That is, the damage of the second type of ammunition to the target is the second damage value.

In some embodiments, in a case of receiving the damage value 84 carried in the second display instruction, the second terminal displays text of "−84" above the target.

In some embodiments, the second terminal plays, according to the second display instruction in the virtual environment, an animation that the target is hit by the second type of ammunition.

In some embodiments, after receiving the second display instruction and the second damage value 84 carried in the second display instruction, the second terminal displays an animation that the target flickers or becomes red, and displays text of "−84" above the target.

Figure 8:
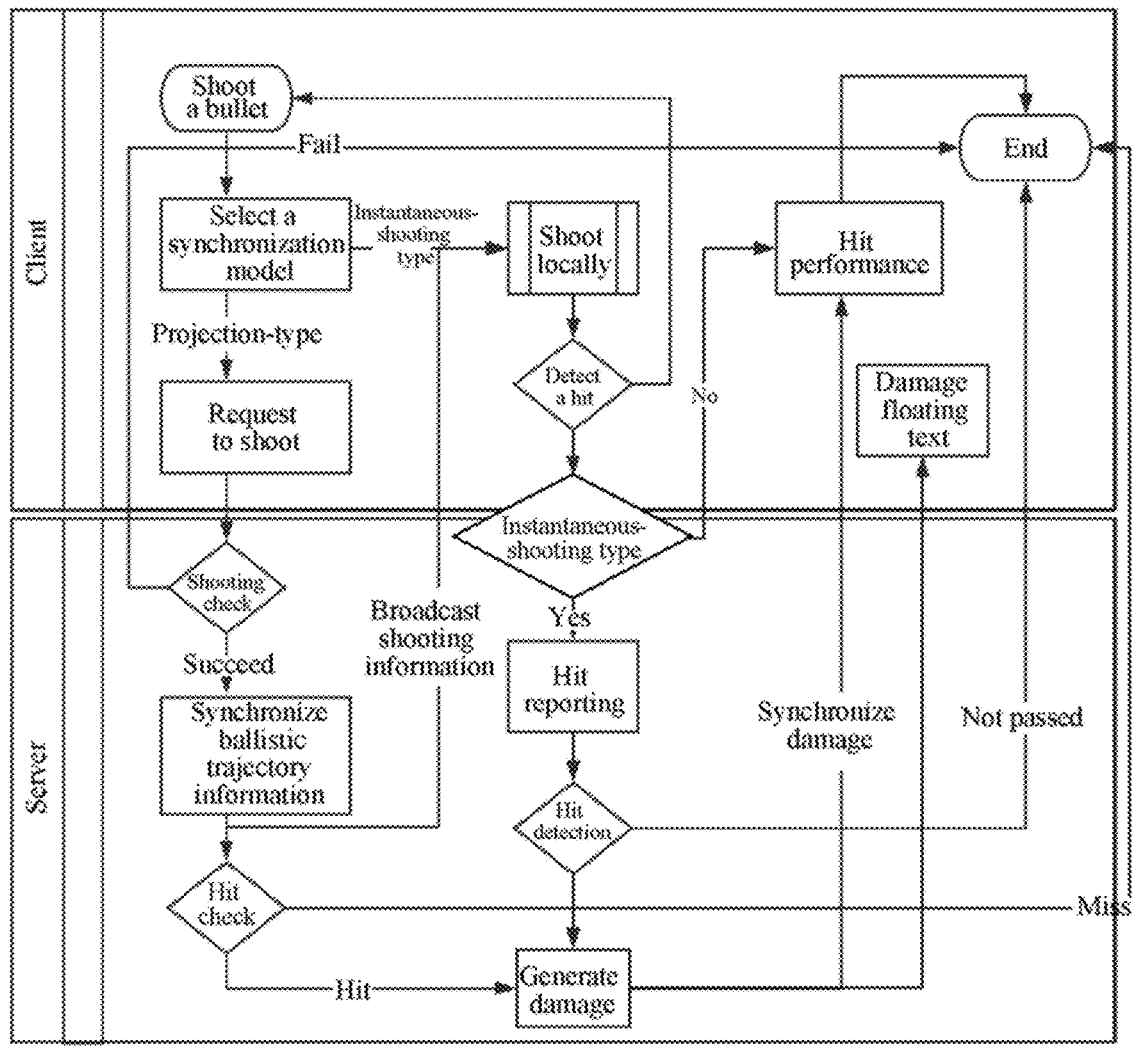
FIG. 8 is an architectural diagram of a synchronization model according to some embodiments.

In some embodiments, as shown in FIG. 8, the first terminal determines, by using a client, whether the shooting signal corresponds to the projection-type ammunition or the instantaneous-shooting-type ammunition, and selects a suitable synchronization model according to the type of ammunition. In a case of determining that the ammunition corresponding to the shooting signal is instantaneous-shooting-type ammunition, the first terminal selects the instantaneous-shooting-type synchronization model, and locally shoots the instantaneous-shooting-type ammunition, to detect whether the instantaneous-shooting-type ammunition hits a target. In a case that the ammunition hits the target, the first terminal determines whether hit performance is the instantaneous-shooting type. In a case that the hit performance is not the instantaneous-shooting type, the first terminal displays a hit performance animation of the target; and in a case that the hit performance is the instantaneous-shooting type, the first terminal reports a hit event to the server, and the server transmits, after performing a validity check on the hit event, an instruction of displaying a hit performance animation and displaying damage floating text to the first terminal.

In a case of determining that the ammunition corresponding to the shooting signal is the projection-type ammunition, the first terminal selects the projection-type synchronization model and transmits a shooting request to the server. The server performs a validity check on the shooting request, and in a case that the shooting request is valid, the server broadcasts an ammunition creating instruction to the first terminal and the second terminal simultaneously, where the ammunition creating instruction is used for creating ammunition and displaying a ballistic trajectory. In addition, the server performs hit detection on the ammunition, and in a case that the ammunition hits a target, the server calculates damage, and transmits the instruction of displaying a hit performance animation and displaying damage floating text to the first terminal and the second terminal simultaneously.

Based on the above, in this embodiment of this application, the second terminal determines the acceleration of the second type of ammunition, and displays the ballistic trajectory of the second type of accelerated ammunition according to the acceleration, to resolve the problem that the time used for the second terminal to create the second type of ammunition is later than the first terminal. Consequently, the time used for the ballistic trajectory of the second type of ammunition to hit the target and displayed by the second terminal is not synchronous with the first terminal, thereby improving the accuracy of displaying a shooting ballistic trajectory of the ammunition.

Further, in this embodiment of this application, the first acceleration of the second type of ammunition is calculated by the second terminal according to the second network latency, to further display a ballistic trajectory of the second type of accelerated ammunition according to the first acceleration in the virtual environment. Because the first acceleration is obtained through calculation according to the second network latency, the latency in hitting, by the ballistic trajectory of the second type of ammunition, the target in the second terminal may be reduced to some extent, thereby improving the accuracy of the shooting display of the virtual object.

Further, in this embodiment of this application, the second acceleration of the second type of ammunition is calculated by the second terminal according to the first network latency and the second network latency, to further display a ballistic trajectory of the second type of accelerated ammunition according to the second acceleration in the virtual environment. Because the second acceleration is obtained through calculation according to the first network latency and the second network latency, the latency in hitting, by the ballistic trajectory of the second type of ammunition, the target in the second terminal may be further reduced, thereby improving the accuracy of the shooting display of the virtual object.

Figure 9:
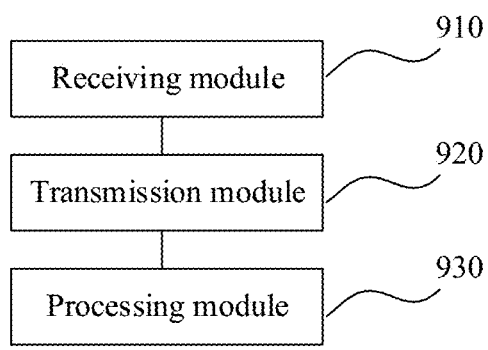
FIG. 9 is a structural block diagram of a ballistic trajectory display apparatus in a virtual environment according to some embodiments.

FIG. 9 shows a structural block diagram of a ballistic trajectory display apparatus in a virtual environment according to some embodiments of this application. The apparatus may be applied to a server, and the apparatus includes a receiving module 910, a transmission module 920, and a processing module 930.

The receiving module 910 is configured to receive a first shooting signal of a first type of ammunition transmitted by a first terminal.

The transmission module 920 is configured to transmit an ammunition creating instruction to the first terminal and a second terminal simultaneously according to the first shooting signal, the ammunition creating instruction being used for instructing the first terminal and the second terminal to create the first type of ammunition and display a ballistic trajectory corresponding to the first type of ammunition in the virtual environment.

The processing module 930 is configured to determine, according to the first shooting signal, whether the first type of ammunition hits a target.

The transmission module 920 is further configured to transmit, in a case of determining that the first type of ammunition hits the target, a first display instruction to the first terminal and the second terminal simultaneously, the first display instruction being used for instructing the first terminal and the second terminal to display a hit result of the first type of ammunition to the target in the virtual environment, and the hit result is damage of the first type of ammunition to the target.

In some embodiments, the processing module 930 is further configured to calculate a first damage value of the first type of ammunition to the target; and In some embodiments, the transmission module 920 is further configured to transmit the first display instruction carrying the first damage value to the first terminal and the second terminal simultaneously, the first display instruction being used for instructing the first terminal and the second terminal to display that the hit result of the first type of ammunition to the target is the first damage value in the virtual environment. That is, the damage of the first type of ammunition to the target is the first damage value.

In some embodiments, the transmission module 920 is further configured to forward the first shooting signal to the second terminal, the first shooting signal being used for instructing the second terminal to play a shooting anticipation animation of the first type of ammunition in the virtual environment.

In some embodiments, the processing module 930 is further configured to detect whether the first shooting signal is valid.

The transmission module 920 is further configured to transmit the ammunition creating instruction to the first terminal and the second terminal in a case that the first shooting signal is valid.

Figure 10:
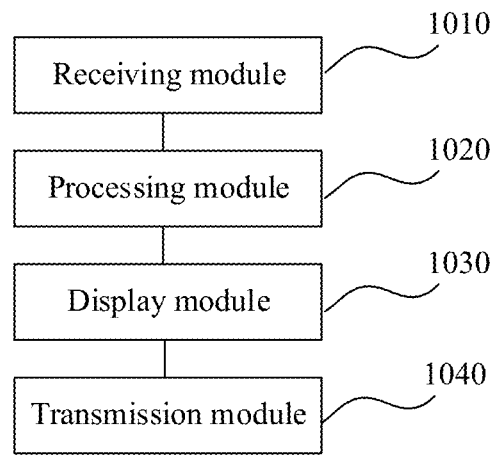
FIG. 10 is a structural block diagram of a ballistic trajectory display apparatus in a virtual environment according to some embodiments.

FIG. 10 shows a structural block diagram of a ballistic trajectory display apparatus in a virtual environment according to some embodiments of this application. The apparatus may be applied to a first terminal or a second terminal, and the apparatus includes a receiving module 1010, a processing module 1020, and a display module 1030. In some embodiments, the apparatus may further include a transmission module 1040.

The receiving module 1010 is configured to receive an ammunition creating instruction transmitted by a server, the ammunition creating instruction being transmitted to at least two terminals simultaneously by the server after receiving a first shooting signal of a first type of ammunition.

The processing module 1020 is configured to create the first type of ammunition according to the ammunition creating instruction.

The display module 1030 is configured to display a ballistic trajectory of the first type of ammunition in the virtual environment.

The receiving module 1010 is further configured to receive a first display instruction transmitted by the server, the first display instruction being transmitted to the at least two terminals simultaneously by the server after determining that the first type of ammunition hits a target.

The display module 1030 is further configured to display a hit result of the first type of ammunition to the target according to the first display instruction in the virtual environment, the hit result referring to damage of the first type of ammunition to the target.

The at least two terminals include a first terminal transmitting the first shooting signal and a second terminal displaying the same virtual environment and corresponding to the first terminal.

In some embodiments, the first display instruction carries a first damage value. In some cases, the display module 1030 is further configured to display that a hit result of the first type of ammunition to the target is the first damage value according to the first display instruction in the virtual environment. That is, the damage of the first type of ammunition to the target is the first damage value.

In some embodiments, the apparatus is applied to the first terminal, and the transmission module 1040 is configured to transmit the first shooting signal of the first type of ammunition to the server.

In some embodiments, the apparatus is applied to the second terminal, the receiving module 1010 is further configured to receive the first shooting signal forwarded by the server, and the display module 1030 is further configured to play the shooting anticipation animation of the first type of ammunition according to the first shooting signal.

Figure 11:
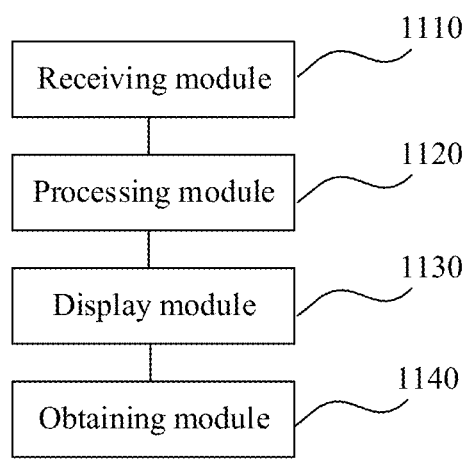
FIG. 11 is a structural block diagram of a ballistic trajectory display apparatus in a virtual environment according to some embodiments.

FIG. 11 shows a structural block diagram of a ballistic trajectory display apparatus in a virtual environment according to some embodiments of this application. The apparatus may be applied to a first terminal or a second terminal, and the apparatus includes a receiving module 1110, a processing module 1120, and a display module 1130. In some embodiments, the apparatus may further include an obtaining module 1140.

The receiving module 1110 is configured to receive a second shooting signal of a second type of ammunition transmitted by a server.

The processing module 1120 is configured to create the second type of ammunition according to the second shooting signal, and determine an acceleration of the second type of ammunition.

The display module 1130 is configured to display a ballistic trajectory of the second type of accelerated ammunition according to the acceleration in the virtual environment.

The receiving module 1110 is further configured to receive a second display instruction transmitted by the server.

The display module 1130 is further configured to display a hit result of the second type of ammunition to the target according to the second display instruction in the virtual environment, the hit result referring to damage of the second type of ammunition to the target.

In some embodiments, the obtaining module 1140 is configured to obtain a second network latency between the second terminal and the server.

The processing module 1120 is further configured to determine a first acceleration of the second type of ammunition according to the second network latency. The display module 1130 is further configured to display a ballistic trajectory of the second type of accelerated ammunition according to the first acceleration.

In some embodiments, the second shooting signal carries a first network latency between the first terminal and the server. In some cases, the obtaining module 1140 is configured to obtain a second network latency between the second terminal and the server. In some cases, the processing module 1120 is further configured to determine a second acceleration of the second type of ammunition according to the first network latency and the second network latency; and the display module 1130 is further configured to display a ballistic trajectory of the second type of accelerated ammunition according to the second acceleration.

In some embodiments, the second display instruction carries a second damage value. In some cases, the display module 1130 is further configured to display that a hit result of the second type of ammunition to the target is the second damage value according to the second display instruction in the virtual environment. That is, the damage of the second type of ammunition to the target is the second damage value.

Figure 12:
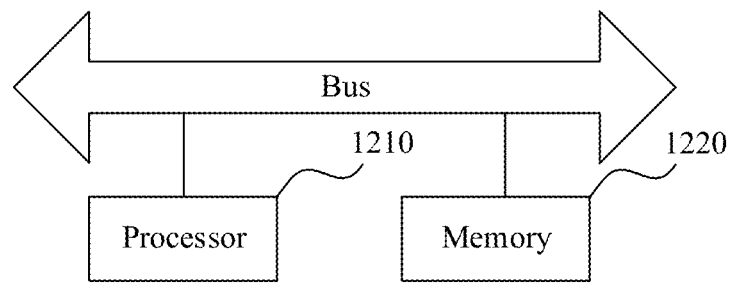
FIG. 12 is a structural block diagram of a ballistic trajectory display device in a virtual environment according to some embodiments.

FIG. 12 shows a structural block diagram of a ballistic trajectory display device in a virtual environment according to some embodiments of this application. The device includes a processor 1210 and a memory 1220.

The processor 1210 may be a central processing unit (CPU), a network processor (NP), or a combination of the CPU and the NP. The processor 1210 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 1220 is connected to the processor 1210 by using a bus or via other data communication connections. The memory 1220 stores at least one instruction, at least one program, a code set or an instruction set. The at least one instruction, the at least one program, the code set or the instruction set is loaded and executed by the processor 1210 to implement the ballistic trajectory display method in a virtual environment shown in FIG. 2, FIG. 3, FIG. 6, or FIG.

7. The memory 1220 may be a volatile memory, a non-volatile memory, or a combination thereof. The volatile memory may be a random access memory (RAM), for example, a static random access memory (SRAM) or a dynamic random access memory (DRAM). The non-volatile memory may be a read-only memory (ROM), for example, a programmable read-only memory (PROM), an erasable programmable read-only memory (EPROM), or an electrically erasable programmable read-only memory (EEPROM). The non-volatile memory may alternatively be a flash memory or a magnetic memory, for example, a magnetic tape, a floppy disk, or a hard disk. The non-volatile memory may alternatively be an optical disc.

This application further provides a computer-readable storage medium, the storage medium storing at least one instruction, at least one program, a code set, or an instruction set, and the at least one instruction, the at least one program, the code set or the instruction set being loaded and executed by a processor to implement the ballistic trajectory display method in a virtual environment according to the foregoing method embodiments.

In some embodiments, this application further provides a computer program product including an instruction, when being run on a computer, the computer program product causing the computer to perform the ballistic trajectory display method in a virtual environment according to the foregoing various aspects.

It is to be understood that "plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this application are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are example embodiments of this application, but are not intended to limit this application. Any modification, equivalent replacement, or improvement made within the spirit and principle of this application shall fall within the protection scope of this application.

What is claimed is:

1. A ballistic trajectory display method in a virtual environment, performed by a server, the method comprising:
receiving, by the server, a first shooting signal of a first type of ammunition transmitted by a first terminal;
transmitting, by the server, an ammunition creating instruction to the first terminal and a second terminal simultaneously in response to the first shooting signal, the ammunition creating instruction being used for instructing the first terminal and the second terminal to create the first type of ammunition and display a ballistic trajectory corresponding to the first type of ammunition in the virtual environment;
determining, by the server according to the first shooting signal, whether the first type of ammunition hits a target; and
transmitting, by the server in response to determining that the first type of ammunition hits the target, a first display instruction, which is separate from the ammunition creating instruction, to the first terminal and the second terminal simultaneously after transmitting the ammunition creating instruction, the first display instruction being used for instructing the first terminal and the second terminal to display a hit result of the first type of ammunition to the target in the virtual environment.

2. The method according to claim 1, wherein after the determining that the first type of ammunition hits the target, the method further comprises:
calculating a first damage value of the first type of ammunition to the target.

3. The method according to claim 2, wherein the transmitting a first display instruction to the first terminal and the second terminal simultaneously comprises:
transmitting the first display instruction carrying the first damage value to the first terminal and the second terminal simultaneously.

4. The method according to claim 3, wherein the first display instruction is used for instructing the first terminal and the second terminal to display that the hit result of the first type of ammunition to the target is the first damage value in the virtual environment.

5. The method according to claim 1, wherein after the receiving a first shooting signal of a first type of ammunition transmitted by a first terminal, the method further comprises:
forwarding the first shooting signal to the second terminal.

6. The method according to claim 5, wherein the first shooting signal is used for instructing the second terminal to play a shooting anticipation animation of the first type of ammunition in the virtual environment.

7. The method according to claim 1, wherein after the receiving a first shooting signal of a first type of ammunition transmitted by a first terminal, the method further comprises:
detecting whether the first shooting signal is valid.

8. The method according to claim 1, further comprising: verifying validity of the first shooting signal.

9. A ballistic trajectory display method in a virtual environment, performed by a first terminal, a second terminal, or both, the method comprising:
receiving an ammunition creating instruction transmitted by a server, the ammunition creating instruction being transmitted to at least two terminals simultaneously by the server after receiving a first shooting signal of a first type of ammunition;
creating the first type of ammunition according to the ammunition creating instruction, and displaying a ballistic trajectory of the first type of ammunition in the virtual environment;
receiving, separately from receiving the ammunition creating instruction, a first display instruction separated from the ammunition creating instruction and transmitted by the server, the first display instruction being transmitted to the at least two terminals simultaneously by the server after determining that the first type of ammunition hits a target; and
displaying a hit result of the first type of ammunition to the target according to the first display instruction in the virtual environment,
the at least two terminals comprising the first terminal transmitting the first shooting signal and the second terminal displaying the same virtual environment and corresponding to the first terminal.

10. The method according to claim 9, wherein the first display instruction carries a first damage value; and the displaying a hit result of the first type of ammunition to the target according to the first display instruction in the virtual environment comprises:

displaying that a hit result of the first type of ammunition to the target is the first damage value according to the first display instruction in the virtual environment.

11. The method according to claim 9, wherein the method is applied to the first terminal, and before the receiving an ammunition creating instruction transmitted by a server, the method further comprises:

transmitting the first shooting signal of the first type of ammunition to the server.

12. The method according to claim 9, wherein the method is applied to the second terminal, and before the receiving an ammunition creating instruction transmitted by a server, the method further comprises:

receiving the first shooting signal forwarded by the server; and playing a shooting anticipation animation of the first type of ammunition according to the first shooting signal in the virtual environment.

13. A ballistic trajectory display apparatus in a virtual environment, comprising:

receiving circuitry configured to receive a first shooting signal of a first type of ammunition transmitted by a first terminal;

transmission circuitry configured to transmit an ammunition creating instruction to the first terminal and a second terminal simultaneously according to the first shooting signal, the ammunition creating instruction being used for instructing the first terminal and the second terminal to create the first type of ammunition and display a ballistic trajectory corresponding to the first type of ammunition in the virtual environment; and processing circuitry configured to determine, according to the first shooting signal, whether the first type of ammunition hits a target, the transmission circuitry being further configured to transmit, in response to determining that the first type of ammunition hits the target, a first display instruction, which is separate from the ammunition creating instruction, to the first terminal and the second terminal simultaneously after transmitting the ammunition creating instruction, the first display instruction being used for instructing the first terminal and the second terminal to display a hit result of the first type of ammunition to the target in the virtual environment.

14. The apparatus according to claim 13, wherein the processing circuitry is further configured to calculate a first damage value of the first type of ammunition to the target.

15. The apparatus according to claim 14, wherein the transmission circuitry is further configured to transmit the first display instruction carrying the first damage value to the first terminal and the second terminal simultaneously.

16. The apparatus according to claim 15, wherein the first display instruction is used for instructing the first terminal and the second terminal to display that the hit result of the first type of ammunition to the target is the first damage value in the virtual environment.

17. The apparatus according to claim 13, wherein the transmission circuitry is further configured to forward the first shooting signal to the second terminal.

18. The apparatus according to claim 17, wherein the first shooting signal being used for instructing the second terminal to play a shooting anticipation animation of the first type of ammunition in the virtual environment.

19. The apparatus according to claim 13, wherein the processing circuitry is further configured to detect whether the first shooting signal is valid.

20. The apparatus according to claim 13, wherein the processing circuitry is further configured to verify validity of the first shooting signal.

\* \* \* \* \*